April 27, 1965
L. C. NOLTE
3,180,071
SUCTION CLEANER
Filed Oct. 26, 1960
6 Sheets-Sheet 1
FIG. 1
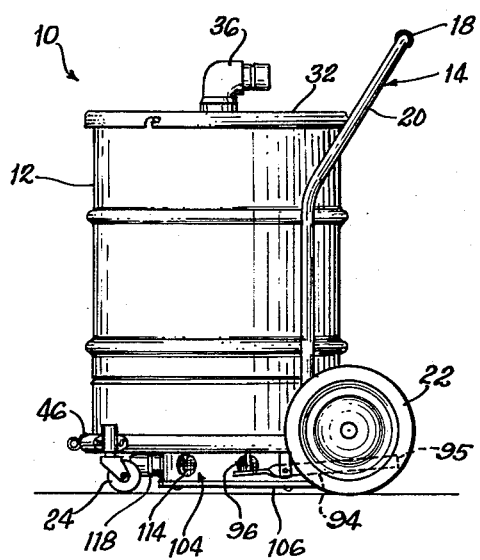
FIG. 4
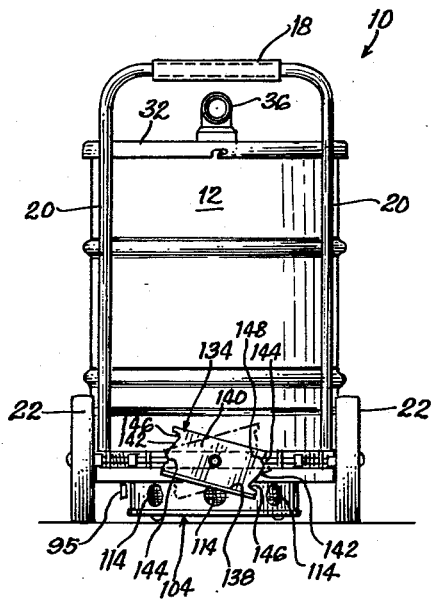
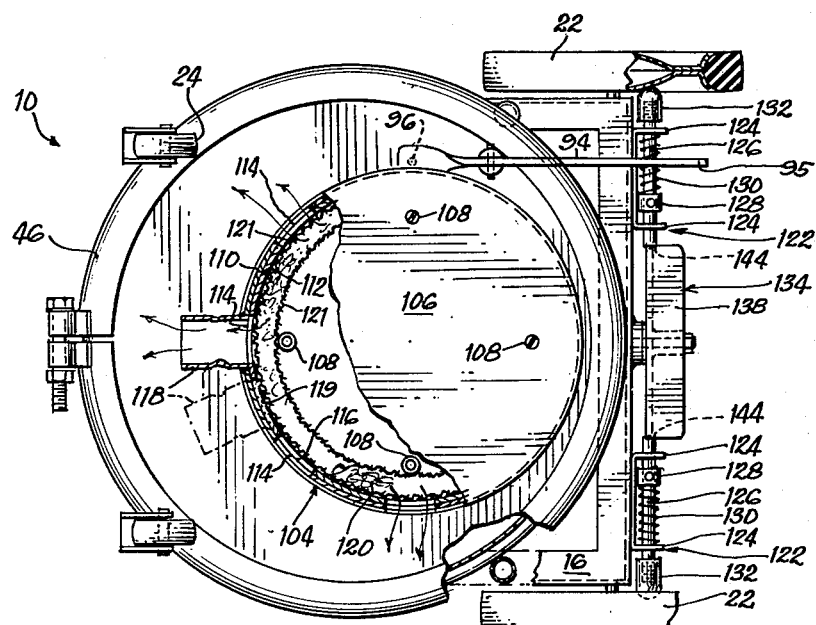
FIG. 5
INVENTOR.
Louis C. Nolte
BY
Julius L. Rubinstein
Att'y April 27, 1965
L. C. NOLTE
3,180,071
SUCTION CLEANER
Filed Oct. 26, 1960
6 Sheets-Sheet 2
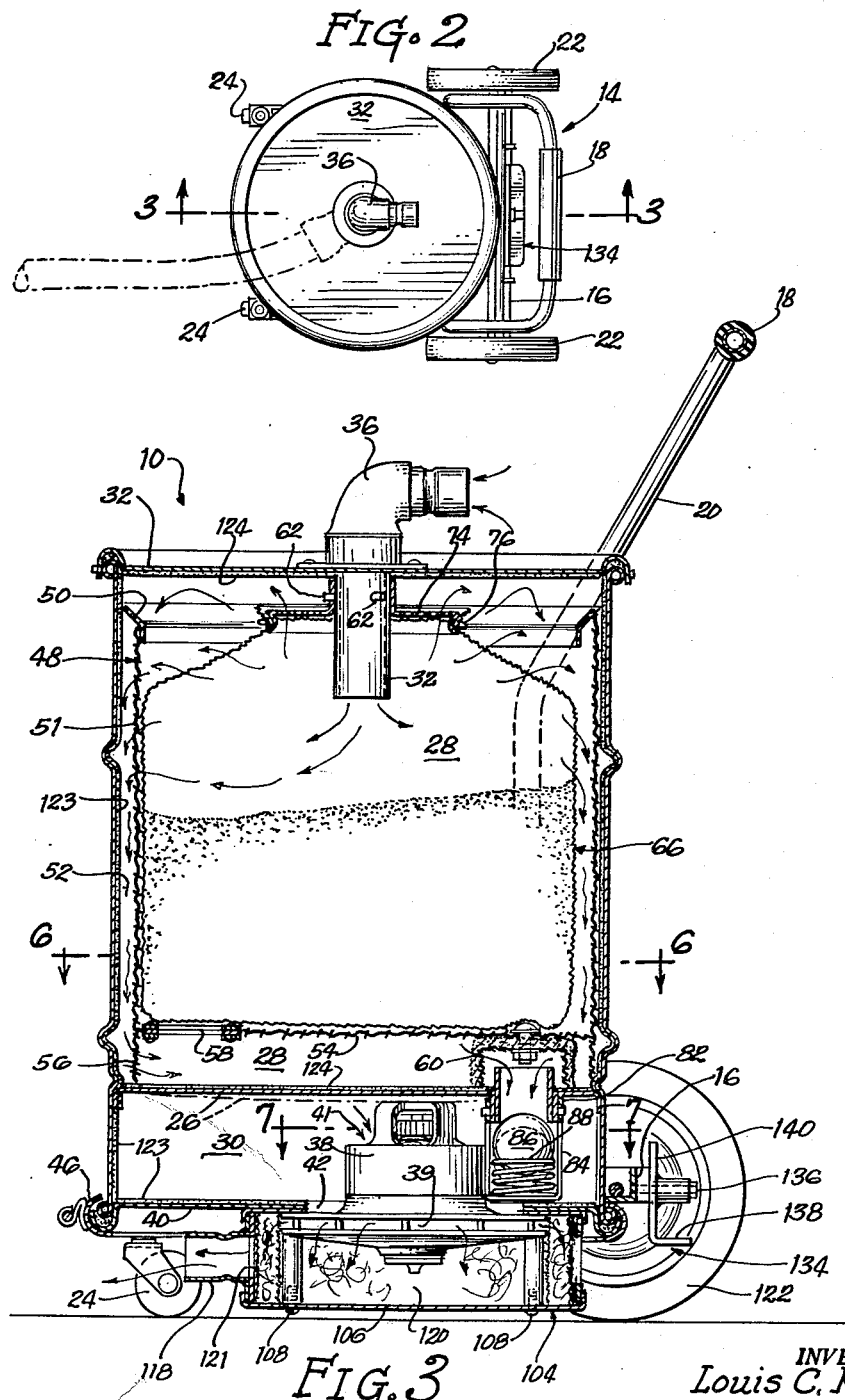
INVENTOR.
Louis C. Nolte
BY
Julius L. Rubinstein
Att'y April 27, 1965 L. C. NOLTE 3,180,071
SUCTION CLEANER
Filed Oct. 26, 1960 6 Sheets-Sheet 3

INVENTOR.
Louis C. Nolte
BY
Julius L. Rubinstein
Att'y

April 27, 1965 L. C. NOLTE 3,180,071
SUCTION CLEANER
Filed Oct. 26, 1960 6 Sheets-Sheet 4

INVENTOR.
Louis C. Nolte
BY
Julius L. Rubinstein
Att'y

April 27, 1965 L. C. NOLTE 3,180,071
SUCTION CLEANER
Filed Oct. 26, 1960 6 Sheets-Sheet 5
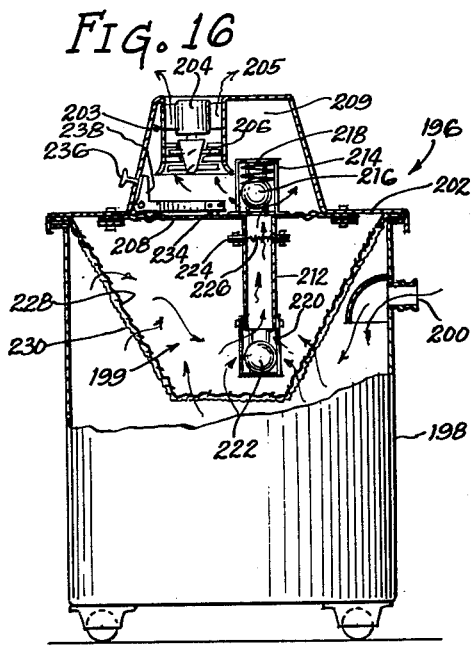
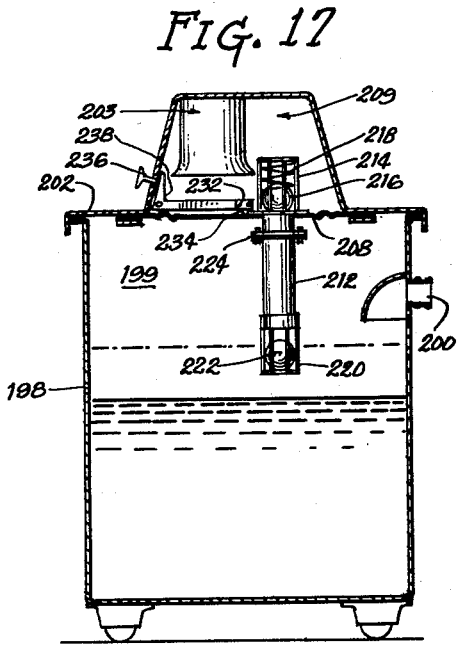
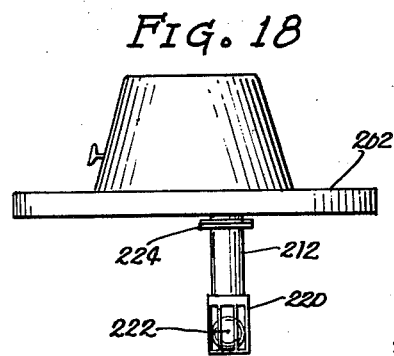
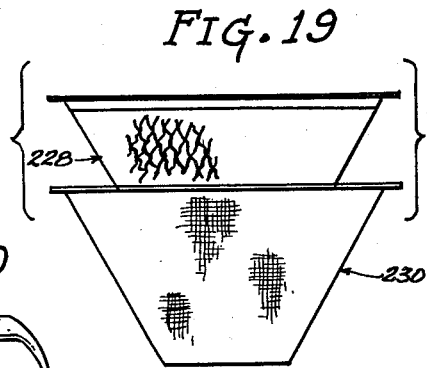
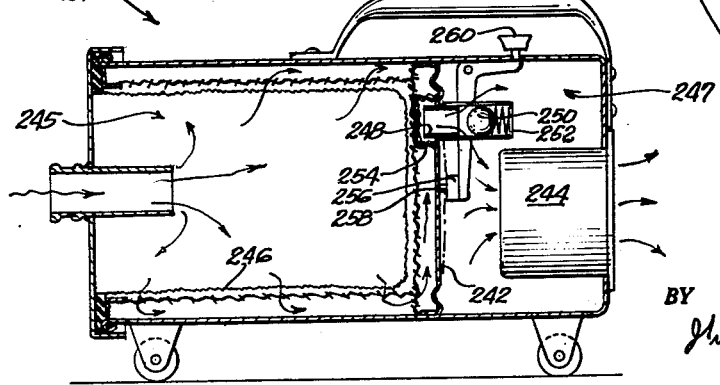
INVENTOR.
Louis C. Nolte
BY
Julius L. Rubinstein
Atty April 27, 1965    L. C. NOLTE    3,180,071
SUCTION CLEANER Filed Oct. 26, 1960    6 Sheets-Sheet 6

INVENTOR.
Louis C. Nolte
BY
Julius L. Rubinstein
Att'y

United States Patent Office 3,180,071
Patented Apr. 27, 1965

3,180,071
SUCTION CLEANER
Louis C. Nolte, 415 E. Potter, Wood Dale, Ill.
Filed Oct. 26, 1960, Ser. No. 65,083
17 Claims. (Cl. 55—213)

This invention relates generally to a cleaning device and more particularly to an improved suction cleaner for efficiently picking up large quantities of dirt or water.

Suction cleaners capable of either wet or dry pick up operation generally comprise an electric fan or blower which is mounted on a support and fitted on a barrel or drum shaped container. Operation of the fan is designed to exhaust air from the container and an air inlet conduit extending through the walls of the container provide a continuous air flow therethrough. The inlet conduit is designed to be connected to a flexible hose and cleaning tool in a manner well known in the art.

When the suction cleaner is used to pick up dry material such as dust, it is desirable to place a filter in the path of the air drawn to the fan to prevent the dust picked up by the cleaner from fouling the motor or the fan blades and thereafter being discharged back into the atmosphere. This creates a problem because dirt tends to clog the filter. Some suction cleaners use motors which are cooled by the air flow through the cleaner and when this air flow is cut off because of a clogged filter there is a danger that the motor may overheat causing the lubrication to evaporate, resulting in bearing failure. In addition the high motor temperature can melt the varnish on the motor windings causing them to short circuit.

Other vacuum cleaners use motors which employ auxiliary cooling means and consequently are not affected or damaged by a clogged filter. However, regardless of the design of the motor used in the suction cleaner, experience has shown that operators of suction cleaners design for commercial use such as in large factories or office buildings are frequently not attentive to the machine and they may continue to operate the machine even after a clogged filter substantially destroys the suction. Under these circumstances they don't do a proper cleaning job and their efforts are economically wasteful. Consequently, no matter what kind of motor is used in a suction cleaner, it is desirable to provide means for automatically stopping the motor whenever the filter becomes clogged, thereby forcing the operator to take proper measures to restore operation.

Besides a clogged filter, defects in the motor or other parts of the cleaner, or lack of the correct voltage may adversely affect the suction in the cleaner and thus make it uneconomical to use the machine. Consequently it would be desirable to provide means for automatically stopping the motor in the suction cleaner whenever the suction, for any reason, decreases below a predetermined level.

It is evident that the larger the filter the longer the cleaner can be operated before filter clogging seriously affects the suction. As a result, some suction cleaners are provided with large filter bags which are placed in the container with the mouth of the filter bag connected to the inlet conduit. This arrangement is desirable because the filter bags provide a larger filter area and they provide a convenient way of disposing of the dirt picked up by the cleaner. However, the design of these filter bags and their position with respect to the direction of air flow in the container is important. The reason is that if careful attention is not given to these details the filter bag may clog well before it is filled with dirt, thereby reducing suction and making further operation of the suction cleaner inefficient.

It is also desirable for the filter bag to be substantially as large as the container in order to permit the suction cleaner to pick up the largest possible quantity of dirt. This is not easy to achieve because if careful attention is not given to the design of the suction cleaner and the filter bag, the filter bag could expand against the inner walls of the container before it fills with dirt. If this happens, the air flow through the suction cleaner could be cut off so that the filter bag can never be completely filled with dirt. It is apparent that it would be desirable to provide a suction cleaner with a filter bag substantially as large as the container and which is designed so the filter bag can be almost completely filled with dirt before the suction at the inlet of the container is adversely affected.

In addition, if the filter bag should rupture it would be desirable to provide means for stopping the motor promptly and thus prevent large quantities of dirt from being drawn into the motor and possibly damaging it.

When a suction cleaner is used to pick up water or other liquids, the filter bag is removed from the container and either a water can is substituted, or else the container itself is used as a water can. It is apparent that it is important to prevent the suction cleaner from picking up more water than the can or container can hold. In the past this was done by a suitable float valve arrangement which cut off the suction when the water level, in the can or container rose to a predetermined level. This arrangement left the motor running, and it was possible for an inattentive operator to keep operating the cleaner even after the suction was cut off. Also depending on the motor design, continued operation of the motor after suction was lost could damage the motor due to the loss of the cooling air flow through the container and motor. Instead of merely cutting off the suction in the container it is apparent that a simple method of cutting off the motor when the water level reaches a predetermined depth would be desirable.

In view of the above described considerations, it is apparent that it would be desirable to provide a suction cleaner powered by any kind of motor having a structure suitable for both wet and dry pick up, and which automatically turns off the motor when a predetermined quantity of dirt or water is picked up or if the filter ruptures.

What is needed therefore and comprises an important object of this invention is a suction cleaner having all the above described desirable features.

These and other objects of this invention will become more apparent in the light of the specification and the accompanying drawings wherein:

FIG. 1 is a side elevational view of the improved suction cleaner.

FIG. 2 is a plan view of the suction cleaner shown in FIG. 1.

FIG. 3 is an enlarged sectional view taken on the line 3—3 of FIG. 2.

FIG. 4 is a rear elevational view of the improved suction cleaner.

FIG. 5 is a bottom view of the improved suction cleaner with parts broken away to show details of the blower structure.

FIG. 16 is an elevational view partly in section showing a modification of the suction cleaner disclosed in FIG. 3 being used for picking up dry material.

FIG. 17 is an elevational view partly in section showing the suction cleaner disclosed in FIG. 16 being used to pick up a liquid.

FIG. 18 is an elevational view of the head of the suction cleaner show in FIGS. 16 and 17.

FIG. 19 is an elevational view of the filter and filter support member in a partly separated position.

FIG. 20 is a modification showing a suction cleaner embodying the principles of this invention designed for home use.

Figure 6:
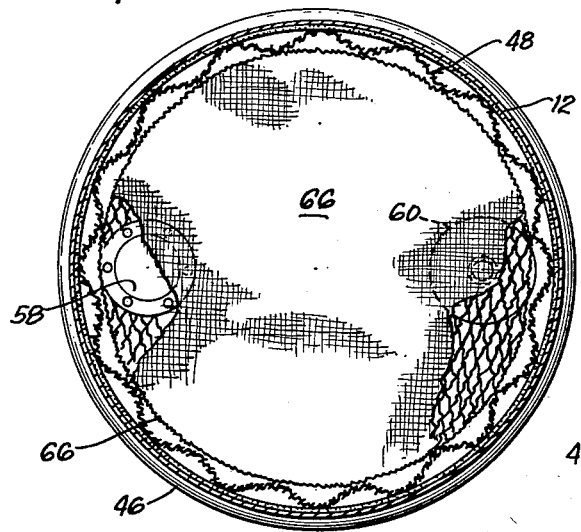
FIG. 6 is a sectional view taken on the line 6—6 of FIG. 3.

Referring now to FIG. 1 of the drawings, a suction cleaner indicated generally by the reference numeral 10 comprises a generally cylindrical drum-shaped housing 12. The housing is attached by any suitable means to a sort of hand truck 14, see FIG. 2, comprising a support 16, a horizontal bar 18, downwardly extending leg bars 20, and rear wheels 22 rotatably attached to the opposite sides of support 16. A pair of caster wheels 24 are mounted at the front of the housing so that the suction cleaner can be easily moved and turned in a manner well known in the art, see FIG. 1.

As seen in FIG. 3, a resilient circular partition 26 is attached to the inner walls of the housing parallel to the upper and lower ends of the housing thereby separating the housing into an upper collecting compartment 28 and a lower suction compartment 30. The upper end of the collecting compartment 28 is closed off by a generally circular lid 32 which is removably attached to the housing by a conventional bayonet lock in a manner well known in the art.

An inlet conduit 34 is attached to the lid 32. This conduit extends down into the collecting compartment far enough so the lower end of inlet conduit 34 acts as a nozzle and directs the material drawn into the collecting compartment 28 toward the bottom thereof. An elbow 36 may be rotatably or swivelly connected to the upper end of conduit 34 for attachment to a suction hose in a manner well known in the art.

Figure 7:
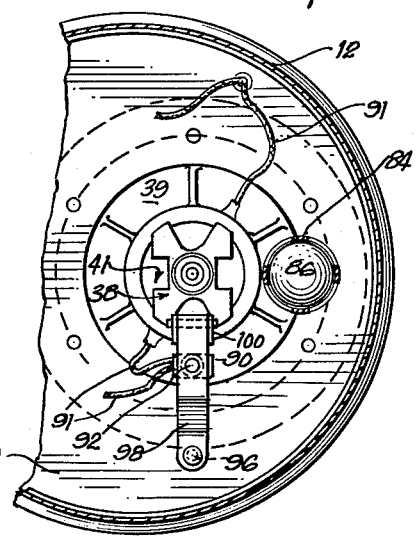
FIG. 7 is a sectional view taken on the line 7—7 of FIG. 3.

An electric motor 38 driving an exhaust fan 39 is mounted over an opening 42 in base plate 40, see FIG. 7. This base plate is removably attached to the lower end of housing 12 closing off the suction compartment 30 by means of a ring shaped clamp 46. As seen in FIG. 5, this clamp also serves as a support for the caster wheels 24. With this arrangement, operation of motor 38 evacuates air from the suction chamber 30 through an outlet 41 defined by the space between the rotating armature and the stationary field coils of the motor, see FIG. 7.

As seen in FIG. 3, a generally cylindrical perforate support member 48, similar in size and shape to the collecting compartment is removably mounted therein. A rim 50 at the upper end of the support member holds the walls 51 of the support member 48 in closely spaced relation to the inner walls of the collecting compartment defining an air passage 52 therebetween. The base 54 of the support member is in upwardly spaced relation to the lower ends 56 of the walls 51. As seen in FIG. 6, a circular opening 58 and a generally cylindrical removably attached safety filter 60 are mounted on diametrically opposite ends of the base 54 of the support member 48, for reasons to become apparent below.

Figures 14, 15:
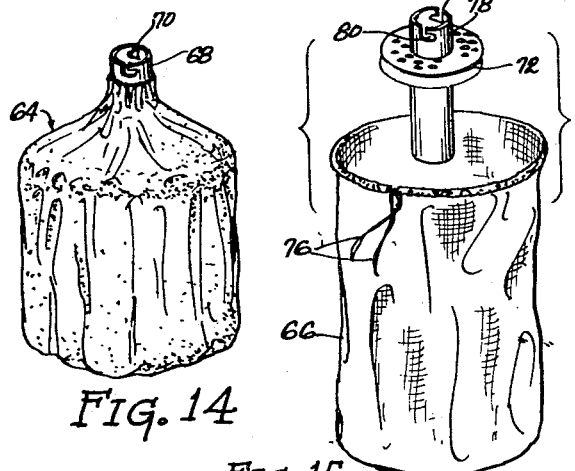
FIG. 14 is a perspective view of a disposable paper filter bag designed for use with the suction cleaner.
FIG. 15 is an exploded perspective view of parts of the reusable filter bag and the adaptor therefore.

The portion of inlet conduit 34 inside the collecting compartment 28 is provided with radially projecting pins 62 which form part of an attachment for filter bags 64 and 66, see FIGS. 14 and 15. Filter bag 64 is disposable and is formed from paper. It has a small mouth and the mouth of the bag is glued or otherwise secured to a cardboard or plastic tube 68. The upper end of tube 68 is provided with bayonet type slots 70 whereby the disposable filter bag 64 can be quickly and removably attached to pins 62 on the inlet conduit 34.

Filter bag 66 is reusable and has a large mouth so that the bag can be easily emptied. The mouth of this bag is removably attached to the grooved periphery 72 of an adaptor plate 74 by means of draw strings 76. The adaptor plate may be perforate and the inner surface of the adaptor plate (not shown) may be proved with a filter (not shown) to prevent dirt from escaping from the filter bag through the perforations in the adaptor plate.

The adaptor plate is also provided with a coaxial upwardly extending tube 78. The upper end of tube 78 is provided with bayonet type slots 80 so that the reusable filter bag 66 can be quickly and removably attached to pins 62 on the inlet conduit 34 in the same manner as the tube 68 on disposable filter bag 64. With this arrangement, when the reusable filter bag is filled with dirt, it is first disconnected from inlet conduit 34 and then the draw strings 76 are loosened and the adaptor plate removed so that the dirt can be easily emptied through the large mouth of the filter bag 66.

In the embodiment shown in FIG. 3, the filter bag happens to be reusable and it is noted that the filter bag is generally similar in shape and size to the supporting member 48 and the collecting compartment 28. In addition, the mouth of the filter bag and the inlet conduit 34 are vertical and coaxial with each other and with the body of the filter bag for reasons to become apparent below.

A tube 82 perpendicular to partition 26 is secured to an opening extending therethrough, thereby establishing air communication between the collecting compartment 28 and the suction compartment 30. As seen in FIG. 3, the end of tube 82 in the collecting compartment 28 is covered by filter 60 when the suction cleaner is used for picking up dry material.

A cage 84 is mounted on the end of tube 82 in suction compartment 30. A ball valve 86 is mounted in this cage and a coil spring 88, mounted in cage 84, biases ball valve 86 to a tube closed position. In order to vary the biasing effect of spring 88, the position of cage 84 may be adjusted axially on the end of tube 82 by any suitable means. As will become apparent below, such a variation may be desirable to compensate the suction cleaner for variations in motor operating conditions or in the fineness of the material drawn into the collecting compartment.

With the structure described above, operation of the motor starts to exhaust the suction chamber 30, and when the suction cleaner is operating normally, the pressure difference between the atmospheric pressure in the collecting compartment and the decreased pressure in the suction compartment is sufficient to draw ball valve 86 away from its pipe closed position despite the biasing force exerted by spring 88. Consequently air communication between the collecting compartment 28 and the suction compartment 30 is established, whereby a suction appears at the inlet conduit 34 drawing air into the collecting compartment 38 down through pipe 82 into the suction compartment from whence it is exhausted through the outlet 41.

Figure 11:
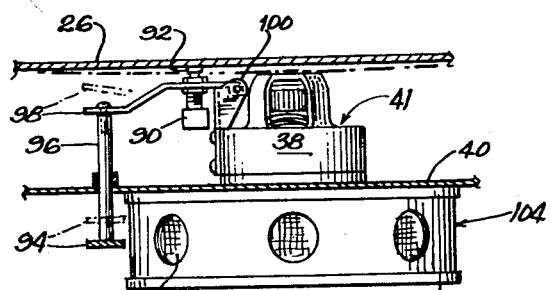
FIG. 11 is an elevational view of the bottom portion of the suction cleaner showing the operation of the device by manual operation of the switch.

Motor 38 is provided with an alternate action switch 90 connected to power leads 91 and having an operating plunger 92, see FIGS. 7 and 11. The head of the operating plunger is positioned just below partition 26 and if the operating plunger is depressed while the motor is operating, power to the motor is cut off until the operating plunger is again depressed. The alternate action switch 90 may be foot operated by means of a pivotally mounted lever 94 one end of which serves as a foot pedal 95, see FIG. 5. The opposite end of the foot pedal is connected to the operating plunger 92 by means of suitable linkage members 96, 98 and 100 shown in FIG. 11 whereby each time the foot pedal is depressed, the switch 90 is actuated. Consequently the motor 38 may be turned on or off by operation of the foot pedal.

As stated above, while the suction cleaner is operating normally, the suction compartment 30 overcomes the biasing force exerted by said spring 88 and holds ball valve 86 away from the lower end of tube 82. However, if the inlet conduit 34 becomes blocked or if the filter bag becomes clogged so that the flow of air from the interior of the filter bag to the exterior of the filter bag in the collecting compartment is cut off, the pressure differential between the suction compartment and the collecting compartment on opposite sides of the partition 26 will decrease whereby the spring 88 will return the ball valve 86 to its tube closed position. When this happens, continued operation of the motor 38 more completely evacuates the suction compartment 30. Since partition 26 is formed from a resilient material, this evacuation of the suction compartment 30 draws parts of the partition 26 from the solid line position shown in FIG. 11 to the flexed dotted line position farther inside compartment 30. Consequently, in this embodiment, the entire partition 26 serves as a diaphragm, although under some circumstances it may be desirable to form a smaller diaphragm in a rigid partition. When partition 26 is drawn farther into the suction chamber 30, it engages operating plunger 92 and depresses it thereby cutting off the motor.

The suction cleaner shown in FIG. 3 is able to maintain almost full suction until the filter bag 66 is substantially filled with dirt, despite the fact that the filter bag is substantially the same size as the collecting compartment. The reason for this is that the dirt drawn through the inlet conduit 34 is directed vertically downward. In addition, by placing the motor at the bottom of the container the downwardly directed suction aided by the force of gravity intensifies the downward movement of the dirt into the collecting compartment causing the dirt to impact on the bottom of the filter bag and remain there. This leaves the walls of the filter bag above the level of the dirt substantially clean and porous so that air can freely pass therethrough.

As the filter bag becomes filled with dirt its sides tend to expand. If the sides of the filter bag expand into engagement with the inner walls of the collecting compartment 28, air flow through the suction cleaner would be cut off, but this is prevented by the perforate sides 51 of the supporting member 48. With this arrangement, the downward flow of air between the outer surface of the filter bag and the inner walls of the collecting compartment is not restricted. In addition, even when the filter bag is almost completely filled with dirt, air may be assisted in escaping from the filter bag by the perforate adaptor plate 74 attached to the mouth of reusable filter bag 66. Consequently there will be no substantial loss of suction until the filter bag is almost completely full of dirt.

Figure 10:
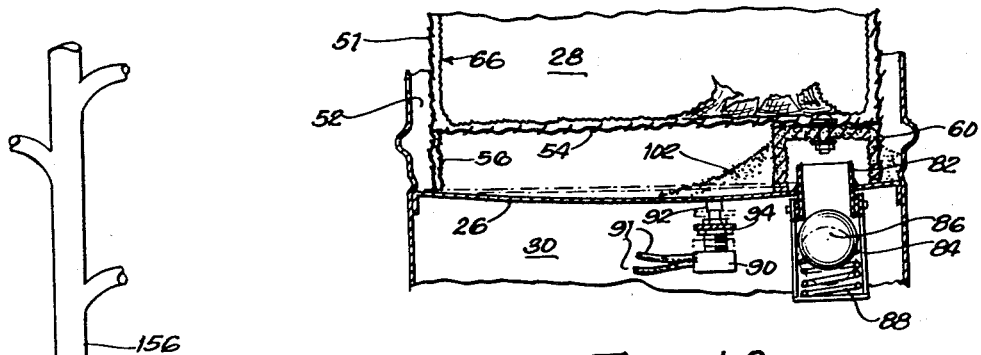
FIG. 10 is an elevational sectional view of a portion of the suction cleaner showing how the motor is cut off when the filter bag breaks.

Referring to FIG. 10, if for any reason the filter bag ruptures or tears, the dirt 102 inside the bag is carried both by the air flow and by gravity to the safety filter 60. This filter is substantially smaller than the first or primary filter bag 66. Consequently the safety filter 60 will clog readily, thereby cutting off the flow of air through tube 82. As a result, continued operation of motor 38 evacuates the suction chamber pulling the partition 26 from its normal dotted line position shown in FIG. 10 to the flexed position shown in solid lines. In so doing, the partition 26 actuates the operating plunger 92 cutting off power to the motor as described above. To restart the motor it is first necessary to replace the filter bag and clean the safety filter. Then the foot pedal 95 is pressed restarting the motor.

Most suction cleaners are designed so the exhaust can be connected to a hose for use as a blower. This requires the size of the outlet of the suction cleaner to be restricted, but when the suction cleaner is being used to pick up dirt and draw it into the collecting compartment, a restriction in the size of the outlet is undesirable because it increases the back pressure on the motor, decreasing motor efficiency.

In the embodiment shown in FIG. 3, this difficulty is overcome by the provision of a housing 104 enclosing fan 39. This housing is secured by any suitable means to the lower surface of base plate 40. As best seen in FIG. 5, housing 104 includes a closure 106 secured to the fan housing by bolts 108 and the housing includes external and internal side walls 110 and 112. The external and internal side walls are provided with a plurality of openings 114 and 116. A combined outlet conduit and handle 118 is secured to external wall 110 over an opening 114. The external side wall 110 is slidably mounted on the internal side walls 112 and the openings 114 and 116 are so disposed with respect to each other that when outlet conduit 118 is in the position shown in FIG. 5, the openings 114 and 116 are all in alignment. This provides an enlarged exhaust opening for the fan blades 39, thereby minimizing back pressure on the fan blades and increasing motor efficiency. But when the outlet conduit 118 and external side wall are pulled to the dotted line position, only one special opening 119 will be in alignment with the outlet conduit 118 and all the other openings will be blocked. Consequently the entire exhaust will be forced through outlet conduit 118. It is apparent that a hose can be connected to the outlet conduit to serve as a blower.

To minimize noise, the interior of housing 104 may be filled with some sound deadening material 120, see FIG. 3. This material may be held in position against the force of the exhaust and prevented from being blown through openings 114 and 116 by means of a reinforcing wire mesh 121 positioned as shown in FIGS. 3 and 5. Similarly the inner walls of the housing 12 may be coated with other sound deadening materials 123.

When the suction cleaner 10 is used, it may be positioned in some convenient location, and a long flexible hose (not shown) may be attached to elbow 36. A tool is attached to the free end of this hose in a manner well known in the art. With this arrangement a considerable floor area may be cleaned without moving the suction cleaner.

Under some circumstances it may be desirable to lock wheels 22 to hold the suction cleaner in a fixed position while it is being used. As shown in FIG. 4, a brake is provided. The brake comprises a pair of brackets 122. These brackets are secured by any suitable means to support 16, see FIG. 5. The brackets are generally channel shaped and aligned openings are formed in the leg members 124. Rods 126 are slidably mounted in the aligned openings on each bracket. A collar 128 is rigidly secured to each rod and a retracting coil spring 130 is positioned between each collar and a leg member to bias the adjacent ends of the rods toward each other. A brake tip 132 formed from rubber or other high friction material is secured to the ends of rods 126 adjacent wheels 22 for locking engagement therewith. The brake tips 132 may be screwed on the ends of the rods as shown to provide compensation for wear.

A brake treadle 134 is pivotally mounted on a pivot rod 136 which projects rearwardly from support 16, see FIG. 3. The brake treadle is L-shaped in cross section with the horizontal portion 138 comprising a pedal and the edges of the vertical portion 140 comprising cam surfaces 142. As best seen in FIG. 4, the adjacent ends 144 of rods 126 ride on these cam surfaces. Each cam surface is provided with rod end receiving grooves 146 and 148 and the diagonal distance between grooves 146 is smaller than the diagonal distance between grooves 148. Consequently by stepping on the brake pedal 138 so the brake treadle 134 pivots to the solid line position shown in FIG. 4 the rods 126 are forced further apart and the brake tips move into locking engagement with wheels 22. When the brake pedal is pivoted to the direction shown in dotted lines in FIG. 4, springs 130 retract the brake tips 132 from their engagement with wheels 22 so that the suction cleaner can again be moved.

Figure 12:
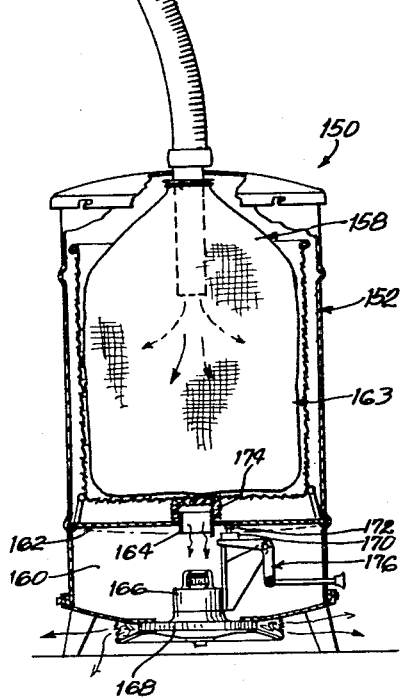
FIG. 12 is an elevational view partly in section showing the suction cleaner being used in a central vacuum system.

The principles of this invention can be applied to a central vacuum system wherein the suction cleaner is mounted in some fixed location and vacuum conduits are permanently mounted in the walls of the building in a manner well known in the art. As shown in FIG. 12, a suction cleaner for a central vacuum system indicated generally by the reference numeral 150 comprises a housing 152 generally similar in structure and operation to the suction cleaner shown in FIG. 3.

As seen, a flexible hose 154 is connected at one end to the inlet conduit of the suction cleaner while the other end of hose 154 is connected to the suction conduits 156 permanently mounted in the walls of the building.

The housing is divided into a collecting compartment 158 and a suction compartment 160 by a resilient partition 162. A filter bag 163 is mounted in the collecting compartment. A tube 164 extends through partition 162. A motor 166 driving an exhaust fan 168 is mounted in the suction compartment 160. An alternate action switch 170 is connected to the power lines of the motor exactly as described in connection with the embodiment shown in FIG. 3. The tip of the operating plunger 172 of the alternate action switch is operatively associated with the partition or diaphragm 162. A safety filter 174 is positioned over the end of tube 164 in the collecting compartment 158. In addition a manually operated restoring mechanism 176 is connected to the operating plunger 172 of the alternate action switch so that the motor 166 can be manually stopped or started as desired.

A number of simplifications are possible in the central vacuum system. For example the suction cleaner 150 needs no wheels or brake mechanism. The blower housing structure connected to the exhaust of the suction cleaner shown in FIG. 3 can be eliminated. In addition, the ball valve structure for closing off tube 16 may be omitted.

Figure 13:
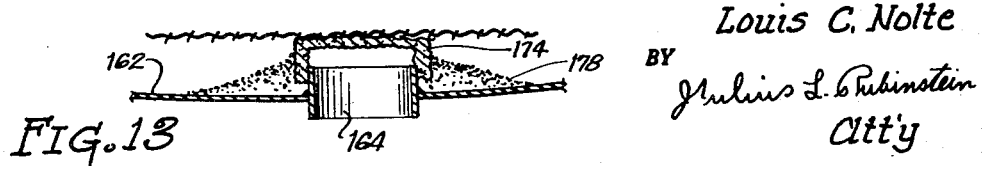
FIG. 13 is an enlarged sectional elevational view of a detail of the central vacuum system showing how a rupture of the filter bag stops operation of the motor.

In operation, dirt is drawn into the collecting compartment 158 from outlets in various rooms of the building, in a manner well known in the art. If for any reason the filter bag 163 ruptures, the dirt retained therein will be drawn down to the safety filter 174 and will rapidly clog it, see FIG. 13. This causes the partition or diaphragm to flex and shut off the motor as described in connection with the embodiment shown in FIG. 3.

Figure 8:
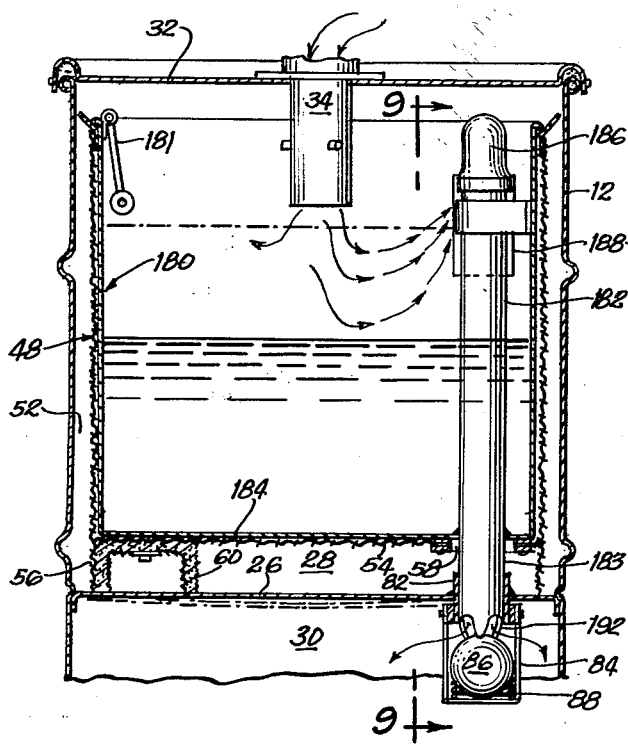
FIG. 8 is an elevational sectional view of a portion of the suction cleaner showing a water can mounted therein with the cleaner ready for wet pick up operation.
Figure 9:
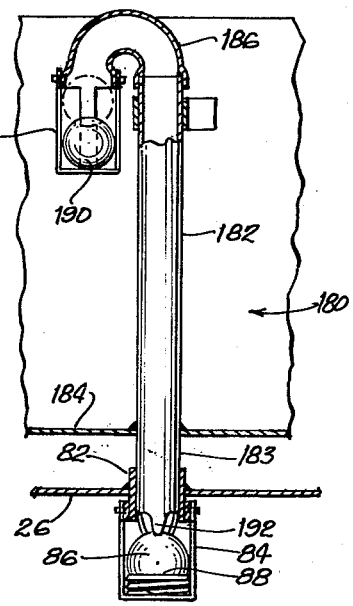
FIG. 9 is a sectional view taken on the line 9—9 of FIG. 8.

The suction cleaner 10 shown in FIGS. 1 and 3 is also designed to pick up liquids such as water. To convert the suction cleaner from dry to wet pick up operation, it is only necessary to remove the filter bag and rotate the perforate support member 48 so that the circular opening 58 in the base 54 of support member 48 is generally coaxial with the tube 82. Next a water can 180 with an attached drop handle 181 is inserted in the collecting compartment 28, see FIG. 8. The water can is provided with a stand pipe 182 extending through its base 184. A generally U-shaped tube 186 is secured to the top of the stand pipe as shown in FIG. 9. A cage 188 is attached to the free end of tube 186 and a float valve 190 is positioned therein.

The lower end 183 of stand pipe 182 projects below base 184 and when the water can 180 is mounted in the collecting compartment 28, the lower end 183 of the stand pipe extends through opening 58 in the base 54 of the support member and into tube 82. Under some circumstances it may be desirable to hold ball valve 86 in a tube open position to prevent valve flutter. This has been done by forming fingers 192 on the extreme end of pipe 182. These fingers engage ball valve 86 when the can is properly mounted in the collecting compartment and they hold the ball valve in a tube open position. An intake hose (not shown) is attached to the inlet conduit 34 in a manner well known in the art.

In operation, the suction at the inlet conduit draws a liquid such as water into the water can. When the water level in can 180 reaches a predetermined depth it lifts float valve 190 to a tube closed position as shown in dotted lines in FIG. 9. Then continued operation of the motor 38 and exhaust fan 29 in the suction compartment 30 creates a pressure differential between the collecting compartment 28 and the suction compartment 30 which flexes the partition diaphragm to its dotted line position shown in FIG. 3, thereby depressing the operating plunger 92 and cutting off power to the motor 38. Consequently the suction at the inlet conduit 34 is cut off and the motor 38 stops operating when the water level reaches a desired depth. With this arrangement the suction cleaner can't be used until the water can is emptied and the foot pedal 95 is pressed to re-start the motor.

The suction cleaners embodying the principles of this invention which have been described so far are characterized by an upper collecting compartment separated from a lower suction compartment by a flexible partition. A filter bag or water can is mounted in the upper collecting compartment and the electric motor and exhaust fan are mounted in the suction compartment. This arrangement is desirable because it permits the suction cleaner to pick up large quantities of material without loss of suction. In addition, from the standpoint of serviceability, the lid of the housing is light and easy to remove because the motor is not attached to it.

However many suction cleaners presently on the market are designed so the motor is mounted on the lid above the collecting compartment, and it may be desirable to modify these cleaners so they incorporate the features of this invention.

The suction cleaner 196 shown in FIG. 16 is representative in general structure to many suction cleaners on the market in that it comprises a housing 198 which serves as the collecting compartment 199. This housing is provided with a dirt or liquid inlet 200. The lid or head 202 of the housing is detachable from the open upper end of the housing by any suitable means. As seen, the lid is provided with a recess in which the blower unit 203 comprising a motor 204 and an exhaust fan 206 are mounted. In this embodiment, the outlet 205 from housing 198 is around motor 204, and motor 204 depends on the air flow through outlet 205 for cooling. As stated above, some motors used in suction cleaners don't require the air flow through the cleaner housing for cooling, but the principles of this invention apply to suction cleaners using any kind of motor.

The general structural arrangement described above may be modified to incorporate the principles of this invention by attaching a partition or diaphragm 208 between the collecting compartment 199 and the blower unit 203 defining thereby a suction compartment 209. The diaphragm is provided with an opening 210 in which a tube 212 is mounted depending therefrom to a point in the collecting compartment 199 below inlet conduit 200.

A first cage 214 is mounted over the upper end of tube 212 in the suction compartment. A ball valve 216 is mounted in this cage with a coil spring 218 to bias the ball valve to a tube closed position. A second cage 220 is secured to the lower end of tube 212 in the collecting compartment 199. A float valve 222 is mounted in this cage.

Tube 212 is separable into two sections at junction 224 by any suitable means, and a safety filter 226 is removably mounted in tube 212 at this junction for reasons to become apparent below. The suction cleaner 196 shown in FIG. 16 is set up for dry pick up operation and accordingly housing 198 is provided with a typical perforate reinforcing member 228 and a filter 230, see FIG. 19. The lower end of tube 212 is above filter 230 for reasons to become apparent below.

An alternate action switch 232 connected to the power lines of the motor 204, is mounted in the suction compartment. This switch has an operating plunger 234 perpendicular to partition 208 and arranged so when the operating plunger is pressed the switch 232 is actuated to turn motor 204 on or off. In addition, a manual reset knob 236 and a linkage mechanism 238 are attached to switch 232 as shown in FIGS. 16 and 17 whereby the switch can be operated manually by pressing knob 236.

In operation, dirt or other material is drawn through inlet 200 and the heavier material falls to the bottom of the collecting compartment 198. Some of the lighter material is carried with the air stream to filter 230 where it is stopped. The filter 230 is porous to air and the air passes through the filter and up tube 212 past ball valve 216 which is held in a tube open position by the pressure differential between the suction compartment 209 and the collecting compartment 199. After passing out of tube 212 in suction compartment 209 the air passes through outlet 205 out of the housing.

A portion of the lighter material which reaches the filter 230 sticks to it so that filter 230 gradually becomes clogged. When this happens the air flow through tube 212 decreases causing a decrease in the pressure differential between the collecting compartment 199 and the suction compartment 209. This permits spring 218 to move ball valve 216 to a tube closed position. Then continued operation of motor 204 draws partition 208 further into the suction compartment thereby actuating the operating plunger 234 to stop the motor.

If filter 230 should tear, dirt will be drawn through tube 212 and will be stopped by the safety filter 226. This filter, because of its small size clogs rapidly, again cutting off the air flow through tube 212 and stopping the motor 204, as described above.

To restart the motor, the filter 230 must be replaced. Then tube 212 must be opened at junction 224 to clean or replace the safety filter 226. Then when everything is reassembled the motor may be restarted by pressing knob 236.

When the suction cleaner shown in FIG. 16 is to be used for wet pick up operation, it is only necessary to remove the filter 230, and if desired the support 228. As liquid is drawn into the collecting compartment through inlet 200 the level of the liquid will gradually rise until it lifts float valve 222 to a closed position, cutting off the air flow through tube 212. This as described above decreases the differential pressure between the collecting compartment 199 and the suction compartment 209 and cuts off the motor. It is important to note that the lid or head 202, shown as a separate unit in FIG. 18, can be used without alteration for both wet and dry pick up operation.

The suction cleaner 240 shown in FIG. 20 is designed for home use, and the general structural arrangement is typical of many vacuum or suction cleaners found in the home. FIG. 20 illustrates the ease by which a conventional home suction cleaner can be modified to include the advantages and features of this invention. This can be done by mounting a resilient partition or diaphragm 242 between the blower unit or motor 244 and the filter bag 246, defining thereby a collecting compartment 245 and a suction compartment 247.

The partition is provided with a tube 248 extending therethrough, with a ball valve 250 and cage 252 at one end in the suction compartment 247 and a safety filter 254 at the other end in the collecting compartment 245. An alternate action switch 256 and operating plunger 258 are mounted in the suction compartment 247 as described in connection with the embodiments shown in FIGS. 3 and 16. In addition, a reset mechanism 260 is connected to the switch 256 for manual operation of the motor. By such a modification the home suction cleaner will automatically stop operating when the filter bag 246 either clogs or ruptures.

The structure so far described for turning off the motor in the suction cleaner when the filter clogs or tears, or in the case of wet pick up operation, when the liquid level in the collecting compartment exceeds a predetermined depth, is economical to make and desirable to use because it does not depend on the design or position of the motor used in the suction cleaner. In particular, the structure so far described works equally well with those suction cleaners having motors which depend on the air flow through the cleaner housing for cooling, and with those suction cleaners having motors which are cooled by some other means.

However, many less expensive suction cleaners use motors which depend on the flow of air through the cleaner housing for cooling. Such suction cleaners may be designed so it is not practical to modify them by the addition of the resilient partition and the other valve elements used in the structure previously described. Instead, a completely electronic device may be more desirable for serving the same function for both wet and dry pick up operation.

Figure 21:
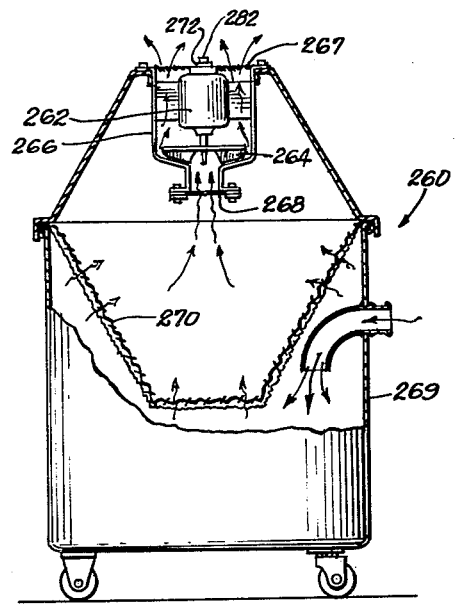
FIG. 21 is an elevational view partly in section showing another modification of the suction cleaner used for picking up dry material.
Figure 23:
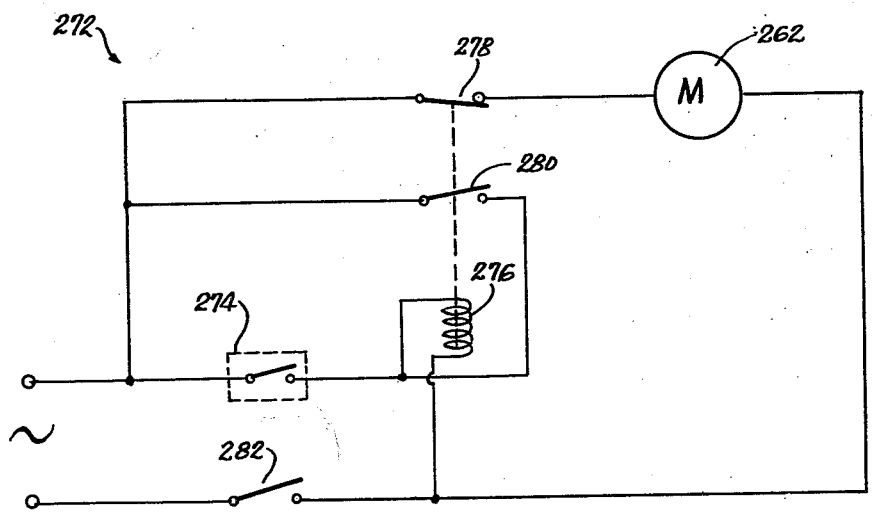
FIG. 23 is a control circuit for use with the suction cleaners shown in FIGS. 21 and 22 operating to turn off the motor when the filter clogs or the liquid level exceeds a predetermined depth.

The suction cleaner shown in FIG. 21 is designed so the motor 262 and exhaust fan 264 are mounted inside the outlet conduit 266 whereby the motor is cooled by the air flowing through the suction cleaner housing 269 and outlet conduit 266. A protective screen 267 is mounted at the upper end of the outlet conduit to prevent objects from accidentally falling therein. A safety filter 268 substantially smaller than the conventional filter 270 is removably mounted at the entrance to the outlet conduit 266. In addition, a thermal control circuit 272 is mounted on motor 262 inside outlet conduit 266. The connection of the thermal control circuit 272 to motor 262 is shown in FIG. 23.

It has been discovered that if filter 270 clogs, the air flow through the outlet conduit 266 will decrease, causing a substantial increase in the temperature of motor 262. When this happens a thermal switch 274 in the control circuit 272 closes. This actuates relay 276 which causes contacts 278 to open and contacts 280 to close. When contacts 278 open, power to motor 262 is cut off. When contacts 280 close, thermal switch 274 is bypassed so the solenoid 276 remains in operation even if the thermal switch 274 opens. To restart the motor, first the filter 270 must be cleaned or replaced while the motor cools enough so thermal switch 274 opens. Then the alternate action motor control switch 282 is pressed causing it to open to the position shown in FIG. 23. This cuts off power to solenoid 276 causing contacts 278 to again close and contacts 280 to open. Then if the alternate action switch is again pressed, it closes causing motor 262 to resume operation.

If the filter 270 should tear, dirt drawn to the motor outlet conduit 266 is stopped by the safety filter 268, which soon clogs. This again cuts off the supply of cooling air through the outlet conduit which raises the motor temperature so that the thermal control circuit is actuated and stops the motor. To restart the motor, the safety filter 268 must be cleaned or replaced and a new filter 270 added. Then when the motor cools enough so the thermal switch 274 opens, the thermal control circuit can be actuated as described above to restart the motor.

Figure 22:
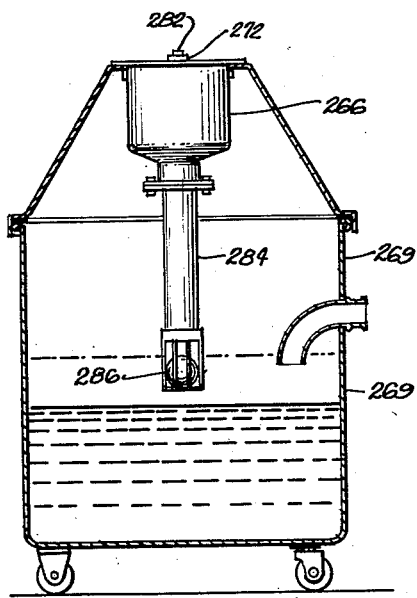
FIG. 22 is an elevational view partly in section showing the suction cleaner disclosed in FIG. 21 used for picking up a liquid.

In order to set up the suction cleaner shown in FIG. 21 for wet pick up operation, it is only necessary to remove filter 270 and replace it by a depending pipe 284 which is attached by any suitable means to the outlet conduit 266, see FIG. 22. A float valve 286 is secured to the lower end of pipe 284. It is apparent that when enough liquid is drawn into the housing, the float valve 286 is lifted to a tube closed position. This cuts off the suction at the housing inlet stopping more liquid from being drawn into the housing. In addition the cooling flow of air through the outlet conduit is cut off causing the temperature of the motor to rise, whereby the thermal control circuit 272 stops the motor as described above. Thus the thermal control circuit 272 works equally well and without adjustment for both wet and dry pick up operation.

The invention may be embodied in other forms without departing from the spirit or essential characteristics thereof as set forth in the claims, and the present embodiment is therefore to be considered as illustrative and not restrictive and is intended to include all changes which come within the scope and range of the claims.

I claim:

1. A suction cleaner of the class described comprising a housing, a partition in said housing separating the housing into a collecting compartment and a suction compartment, an inlet to said collecting compartment and an outlet in said suction compartment, a motor driving an exhaust fan mounted in said suction compartment for evacuating air therefrom through said outlet, said partition having a partition opening extending therethrough and communicating between said collecting compartment and said suction compartment, means associated with said partition opening and operating to close said partition opening in response to predetermined conditions in said collecting compartment, at least a part of said partition comprising a diaphragm whereby when said means closes the partition opening the evacuation of the suction compartment by operation of the motor and exhaust fan draws parts of said diaphragm farther into said suction compartment, said motor having a power cut off, and means connected to said power cut off and associated with said diaphragm whereby when said means closes said partition opening causing portions of said diaphragm to be drawn farther into said suction compartment, the power cut off is actuated to stop the motor.

2. A suction cleaner of the class described comprising a housing, a partition in said housing separating the housing into a collecting compartment and a suction compartment, an inlet to said collecting compartment and an outlet in said suction compartment, a motor driving an exhaust fan mounted in said suction compartment for evacuating air therefrom through said outlet, said partition having a partition opening extending therethrough communicating between said collecting compartment and said suction compartment, means associated with said partition opening and operating to close said partition opening whenever the collected material in said collecting compartment reaches a predetermined level, at least a part of said partition comprising a diaphragm whereby when said means closes the partition opening the evacuation of the suction compartment by operation of the motor and exhaust fan draws parts of said diaphragm farther into said suction compartment, said motor having a power cut off, and means connected to said power cut off and associated with said diaphragm whereby when said means closes said partition opening causing portions of said diaphragm to be drawn farther into said suction compartment the power cut off is actuated to stop the motor.

3. A wet or dry pick up suction cleaner of the class described comprising a housing, a partition in said housing separating the housing into a collecting compartment and a suction compartment, an inlet to said collecting compartment and an outlet in said suction compartment, a motor driving an exhaust fan mounted in said suction compartment for evacuating air therefrom through said outlet, said partition having a partition opening extending therethrough and communicating between said collecting compartment and said suction compartment, means associated with said partition opening and operating to close said partition opening when the suction at the inlet of the collecting compartment falls below a predetermined level, at least a part of said partition comprising a diaphragm whereby when said means closes the partition opening the evacuation of the suction compartment by operation of the motor and the exhaust fan draws parts of said diaphragm farther into said suction compartment, said motor having a power cut off, and means connected to said power cut off and associated with said diaphragm whereby when said means closes said partition opening causing portions of said diaphragm to be drawn farther into said suction compartment the power cut off is actuated to stop the motor.

4. A suction cleaner of the class described comprising a housing, a partition in said housing separating the housing into a collecting compartment and a suction compartment, an inlet in said collecting compartment and an outlet in said suction compartment, a motor driving an exhaust fan mounted in said suction compartment for evacuating air therefrom through said outlet, a first filter in said housing to prevent dirt drawn through said inlet from reaching said motor and for retaining the dirt in said collecting compartment, said partition having a partition opening extending therethrough and communicating between said collecting compartment and said suction compartment, a second filter small in comparison to the size of first filter mounted over said partition opening in the path of air flowing into said suction compartment so that if said first filter ruptures, the dust in said collecting compartment will be drawn to said second filter and will quickly clog it, at least a part of said partition comprising a diaphragm whereby if said second filter clogs, operation of said motor and exhaust fan will result in the evacuation of said suction compartment drawing parts of said diaphragm farther therein, said motor having a power cut off, and means connected to said power cut off and associated with said diaphragm whereby when said portions of said diaphragm are drawn into said suction compartment the power cut off is actuated to stop the motor.

5. A suction cleaner of the class described comprising a generally cylindrical housing, a resilient partition in said housing separating the housing into a collecting compartment and a suction compartment, an inlet in said collecting compartment and an outlet in said suction compartment, a motor driving an exhaust fan mounted in said suction compartment for evacuating air therefrom through said outlet, said partition having a tube extending therethrough, means associated with said tube for closing said tube in response to predetermined conditions in said collecting compartment, at least a part of said partition constituting a diaphragm whereby when said means closes said tube the evacuation of said suction compartment by continued operation of said motor draws portions of said partition into said suction compartment, said motor having a power cut off, and means connected to said power cut off and associated with said partition whereby when said means closes said tube causing portions of said partition to be drawn farther into said suction compartment the power cut off is actuated to stop the motor.

6. A suction cleaner of the class described comprising a generally cylindrical housing, a resilient circular partition in said housing separating the housing into a collecting compartment and a suction compartment, an inlet in said collecting compartment and an outlet in said suction compartment, a motor driving an exhaust fan mounted in said suction compartment for evacuating air therefrom through said outlet, a filter in said housing to prevent dirt drawn through said inlet from reaching the motor and for retaining it in the collecting compartment, said partition having a tube extending therethrough, a valve in said suction compartment for closing said tube, means biasing said valve to the tube closed position, the air flow through said tube when the suction cleaner is operating normally overcoming said biasing means and holding the valve in a tube open position, the entire partition comprising a diaphragm whereby when the valve is in a tube closed position the evacuation of said suction compartment by continued operation of the motor draws portions of said partition farther into said suction compartment, said motor having a power cut off, and means connected to said power cutoff and associated with said partition so that when said partition is drawn farther into said suction compartment the power cut off is actuated to stop the motor, whereby when said filter becomes clogged and causes a decrease in the air flow through said tube, said biasing means returns the valve to a tube closed condition causing the motor to stop.

7. The suction cleaner described in claim 6 wherein said biasing means is adjustable to compensate the valve for variation in motor operating conditions or the kind of dirt being drawn into the collection compartment.

8. A suction cleaner of the class described comprising a cylindrical housing, a resilient circular partition in said housing separating the housing into an upper collecting compartment and a suction compartment, an inlet in said collecting compartment and an outlet in said suction compartment, a motor driving an exhaust fan mounted on said suction compartment for evacuating air therefrom through said outlet, a filter in said housing to prevent dirt drawn through said inlet from reaching the motor and for retaining it in the collecting compartment, said partition having a tube extending therethrough, a cage in said suction compartment secured to the end of said tube, a ball valve in said cage adapted to close off said tube, a spring mounted in said cage and bearing against said ball valve to hold it in a tube closed position, the air flow through said tube when the suction cleaner is operating normally overcoming the force on said ball valve exerted by said spring and holding the ball valve in a tube open position, the entire partition comprising a diaphragm whereby when the ball valve is in a tube closed position the evacuation of said suction compartment by continued operation of the motor draws portions of said partition farther into said suction compartment, said motor having a power cut off, and means connected to said power cut off and associated with said partition so that when said partition is drawn farther into said suction compartment the power cut off is actuated to stop the motor, whereby when said filter becomes clogged and causes a decrease in the air flow through said tube, said biasing means returns the valve to a tube closed position causing the motor to stop.

9. The suction cleaner described in claim 8 wherein said cage is adjustably mounted on said tube to vary the biasing force exerted by said spring to compensate the ball valve for variations in motor operating conditions or in the kind of dirt drawn into the collection compartment.

10. The suction cleaner described in claim 8 including means mounted on said tube in said collecting compartment for decreasing the air flow through said tube if the filter should rupture so that the diaphragm is drawn farther into said suction compartment causing the motor to stop.

11. A suction cleaner of the class described comprising a cylindrical housing, a resilient circular partition in said housing separating the housing into an upper collecting compartment and a suction compartment, an inlet on top of said collecting compartment and an outlet in said suction compartment, a motor driving an exhaust fan mounted in said suction compartment for evacuating air therefrom through said outlet, a filter bag in said collecting compartment with the mouth of said filter bag secured to said inlet, a generally cylindrical perforate supporting member removably mounted in said collecting compartment and surrounding said filter bag, a safety filter mounted in the base of said supporting member, said partition having a tube extending therethrough with the upper portion extending a little way into said collecting compartment, said safety filter fitting over the mouth of said tube in said collecting compartment when said supporting member is positioned therein, a cage secured to the lower portion of said tube in said suction compartment, a ball valve in said cage adapted to close off the lower end of said tube, a spring mounted in said cage and bearing against said ball valve to hold it in a tube closed position, the air flow through said tube when the suction cleaner is operating normally overcoming the force on said ball valve exerted by said spring and holding the ball valve away from the lower end of the tube in a tube open position, the entire partition comprising a diaphragm whereby when the ball valve is in a tube closed position the evacuation of said suction compartment caused by continued operation of the motor draws portions of said partition farther into said suction compartment, said motor having a power cut off, and means connecting to said power cut off and associated with said partition so that when said partition is drawn farther into said suction compartment the power cut off is actuated to stop the motor whereby as said filter bag becomes filled with dirt the air flow therethrough decreases resulting in a decrease in the air flow through said tube so that said spring returns the ball valve to a tube closed position causing the motor to stop, said safety filter positioned below the lower surface of said filter bag so that if said filter bag should tear, the dirt retained therein will be carried by the air stream to said safety filter and will clog it thereby cutting off the air flow through said tube and causing said motor to stop operating.

12. A suction cleaner of the class described comprising a housing, a partition in said housing separating the housing into a liquid collecting compartment and a suction compartment, an inlet in said liquid collecting compartment and an outlet in said suction compartment, a motor driving an exhaust fan mounted in said suction compartment for evacuating air therefrom through said outlet, said partition having a tube extending therethrough to establish air communication between said liquid collecting compartment and said suction compartment, a float valve in said liquid collecting compartment for closing off said tube when the liquid in said collecting compartment reaches a predetermined level, at least a portion of said partition comprising a diaphragm whereby when said float valve has been moved to close off said tube the evacuation of said suction compartment by continued operation of the motor draws portions of said partition farther into said suction compartment, said motor having a power cut off, and means connected to said power cut off and associated with said partition so that when said portions of the partition are drawn farther into said suction compartment the power cut off is actuated, whereby the motor is stopped when the liquid in said liquid collecting compartment reaches a predetermined level.

13. A suction cleaner of the class described comprising a housing, a partition in said housing separating the housing into a collecting compartment and a suction compartment, an inlet in said collecting compartment and an outlet in said suction compartment, a motor driving an exhaust fan mounted in said suction compartment for evacuating air therefrom through said outlet, said partition having an elongated tube extending therethrough to establish air communication between said collecting compartment and said suction compartment, a float valve secured to the end of said elongated tube in said collecting compartment for closing off said end of said tube when liquid is being collected and the level of the liquid reaches a predetermined height, a valve secured to the end of said tube in said suction compartment for closing off the end of said tube in said suction compartment, means biasing said valve to a tube closed position, said valve designed so when the suction cleaner is operating normally the suction in the suction compartment overcomes the biasing force on the valve and holds the valve in a tube open position and designed so that when a filter is mounted in said collecting compartment and becomes clogged the suction in the suction compartment becomes insufficient to overcome the biasing force on the valve whereupon the valve is moved to a tube closed position, at least a part of said partition comprising a diaphragm whereby when either the valve in the suction compartment or the float valve in collecting compartment are in a tube closed position the evacuation of said suction compartment caused by continued operation of the motor draws parts of said partition farther into said suction compartment, said motor having a power cut off, and means connected to said power cut off and associated with said partition so that when said partition is drawn farther into said suction compartment the power cut off is actuated to stop the motor whereby if either a filter in the collecting compartment becomes clogged or the level of liquid drawn into the collecting compartment becomes too high, power to the motor will be cut off.

14. A suction cleaner of the class described comprising a housing, an inlet and an outlet in said housing, a motor driving an exhaust fan mounted in said housing and operating to exhaust air therefrom whereby operation of said motor causes air to flow into said housing through said inlet and out of said housing through said outlet, a filter in the path of said air flow to retain dust drawn through said inlet in said housing, and for preventing said dust from reaching said motor, a motor power cut off connected to said motor, filter rupture responsive means positioned between said filter and said motor, said filter rupture responsive means associated with said motor power cut off and positioned in such a way that if any portion of said filter should rupture, the dust passing through said ruptured portion of the filter and reaching said filter rupture responsive means produces a condition in said filter rupture responsive means which causes said motor power cut off to stop said motor.

15. In a suction cleaner a suction compartment, an outlet in said suction compartment, a motor driving an exhaust fan mounted in said suction compartment for evacuating air therefrom through said outlet, said compartment having a wall, at least a part of said wall comprising a diaphragm, a tube extending through said wall whereby when said suction compartment is fitted on the open end of a container said wall separate the interior of the container from the interior of the suction compartment with said tube establishing air communication therebetween, a valve associated with said suction compartment for closing said tube in response to a decrease in air flow through said tube whereby when said valve closes said tube the evacuation of said suction compartment by operation of said motor driven exhaust fan draws the part of said wall serving as a diaphragm into said suction compartment, said motor having a power cut off, and means connected to said power cut off and associated with said wall in such a way that when said valve closes said tube said diaphragm part of said wall is drawn into said suction compartment into operative association with said means connected to said power cut off to actuate the power cut off and stop the motor.

16. A suction cleaner of the class described comprising in combination a housing, a collecting compartment in said housing, an inlet in said collecting compartment, an electric motor driving an exhaust fan mounted in said housing, an outlet in said housing extending through said motor to the ambient air whereby operation of said motor draws air through said inlet and forces it through said motor and out of said housing both to maintain a continuous suction at the inlet and to cool the motor, a main filter mounted in said collecting compartment whereby dirt drawn through said inlet is prevented from passing through said motor and is retained in said collecting compartment, thermally responsive means connected to the power lines of the motor so that if the main filter clogs and prevents a cooling flow of air through said motor the temperature of the motor rises until said thermally responsive means cuts off power to the motor, a safety filter positioned between said main filter and said motor and in the path of all air flowing through said housing so all air entering the suction cleaner at said inlet must pass through said safety filter whereby if any part of the main filter ruptures dust is carried to the safety filter and is prevented thereby from passing through and damaging the motor, said safety filter small in comparison to the size of the main filter so it clogs rapidly if the main filter ruptures and thereby prevents a cooling flow of air from passing through the motor whereby the temperature of the motor will rapidly rise and cause the thermally responsive means to stop the motor.

17. A suction cleaner of the class described comprising a housing, a material collector and a suction compartment in said housing, an inlet connected to said material collector and an outlet in said suction compartment, a motor driving an exhaust fan mounted in said suction compartment and operating to exhaust air therefrom whereby operation of said motor causes air to flow into said material collector and through said inlet and out of said suction compartment through said outlet, a dust collecting filter in the path of said air flow to retain dust in said material collector and to prevent dust drawn through said inlet from reaching said motor, and filter rupture responsive means positioned between said filter and said motor and functioning in such a way that if any portion of said dust collecting filter ruptures the dust passing through said ruptured portion of the dust collecting filter and reaching said filter rupture responsive means causes a condition in said filter rupture responsive means which automatically produces a change in the pressure differential between said material collector and the suction compartment, a pressure differential motor power cut off connected to said motor so that when the dust collecting filter ruptures and the filter rupture responsive means causes a change in the pressure differential between said material collector and said suction compartment, the pressure differential motor power cut off is actuated to cut off power to the motor.

References Cited by the Examiner

UNITED STATES PATENTS

| 992,364 | 5/11 | Leasure | 55—469 |
|---|---|---|---|
| 2,171,248 | 8/39 | Van Berkel | 55—472 |
| 2,277,069 | 3/42 | Burwell | 55—417 |
| 2,335,428 | 11/43 | Lofgren | 55—372 |
| 2,534,808 | 12/50 | Bevington et al. | |
| 2,597,690 | 5/52 | Wied | 55—417 |
| 2,625,239 | 1/53 | Senne | 55—217 |
| 2,656,897 | 10/53 | Yonkers. | |
| 2,700,430 | 1/55 | Gerber | 55—372 |
| 2,715,452 | 8/55 | Kent. | |
| 2,731,103 | 1/56 | Ortega | 55—164 |
| 2,804,164 | 8/57 | Brace. | |
| 2,863,524 | 12/58 | Buda | 55—216 |
| 2,982,511 | 6/59 | Gall et al. | 55—472 |
| 2,916,104 | 12/59 | Hultberg et al. | |

FOREIGN PATENTS 652,053   8/35   Germany.

HARRY B. THORNTON, *Primary Examiner.*

WALTER BERLOWITZ, *Examiner.*